Mar. 20, 1923.
G. D. BEVIS
AIR COUPLING
Filed July 11, 1921        4 sheets-sheet 1
1,449,261
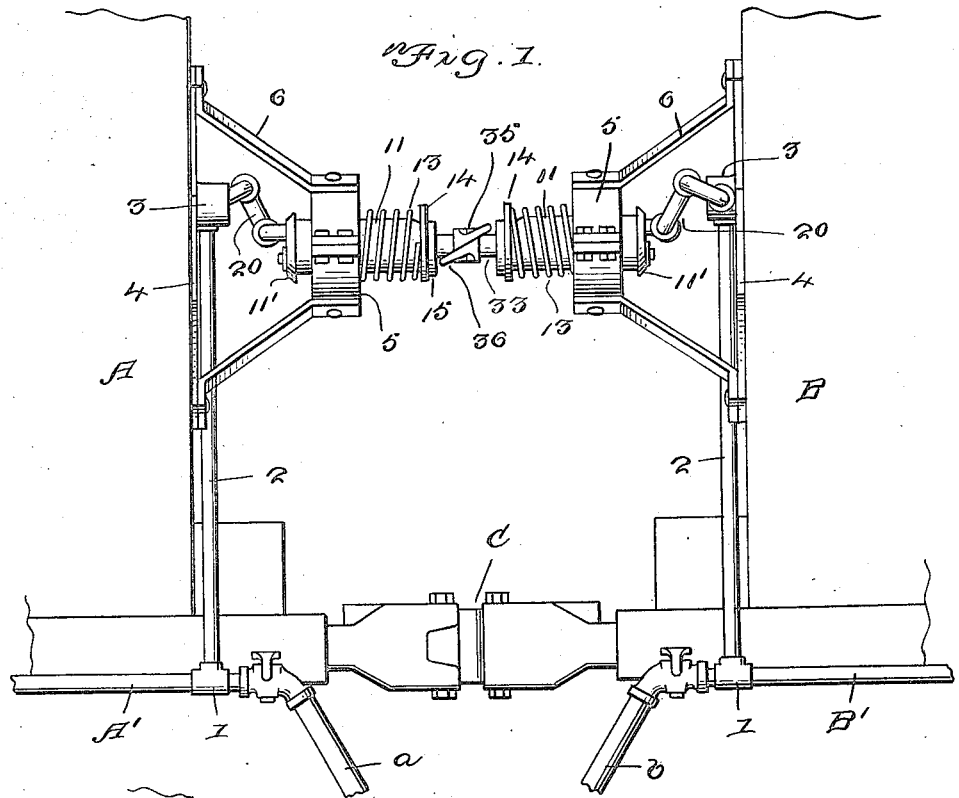
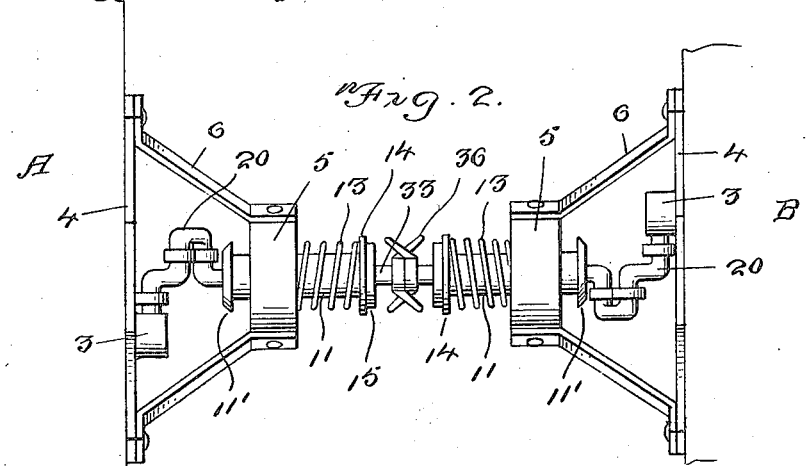
WITNESS: E. R. Ruppert.
G. D. Bevis
INVENTOR
BY Victor J. Evans
ATTORNEY Mar. 20, 1923.

G. D. BEVIS

AIR COUPLING

Filed July 11, 1921

G. D. Bevis
INVENTOR

BY Victor J. Evans
ATTORNEY

WITNESS: E. R. Ruppert

Mar. 20, 1923.
G. D. BEVIS
AIR COUPLING
Filed July 11, 1921    4 sheets-sheet 3
1,449,261
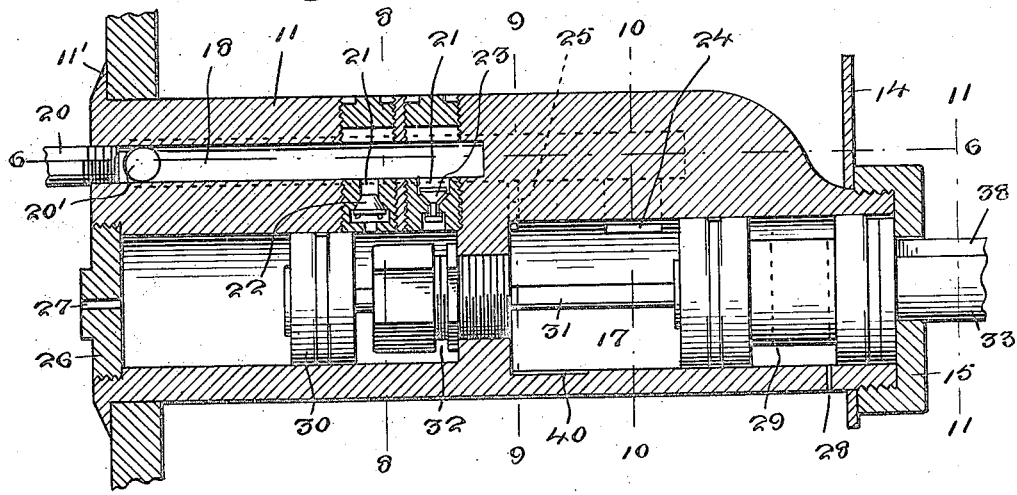
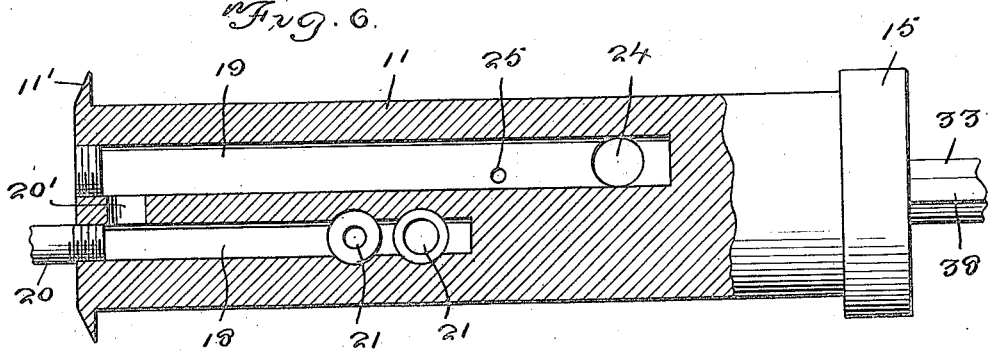
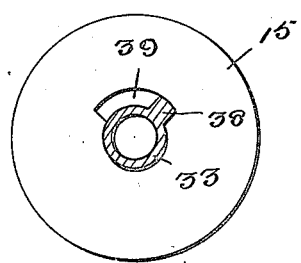
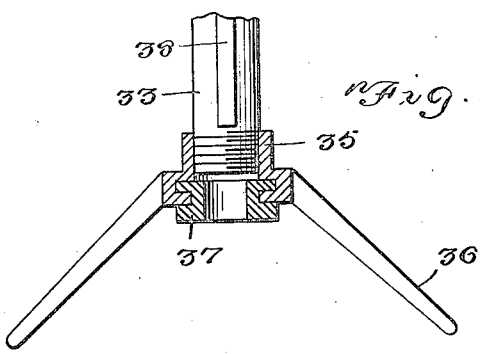
G. D. Bevis
INVENTOR
BY Victor J. Evans
ATTORNEY
WITNESS:

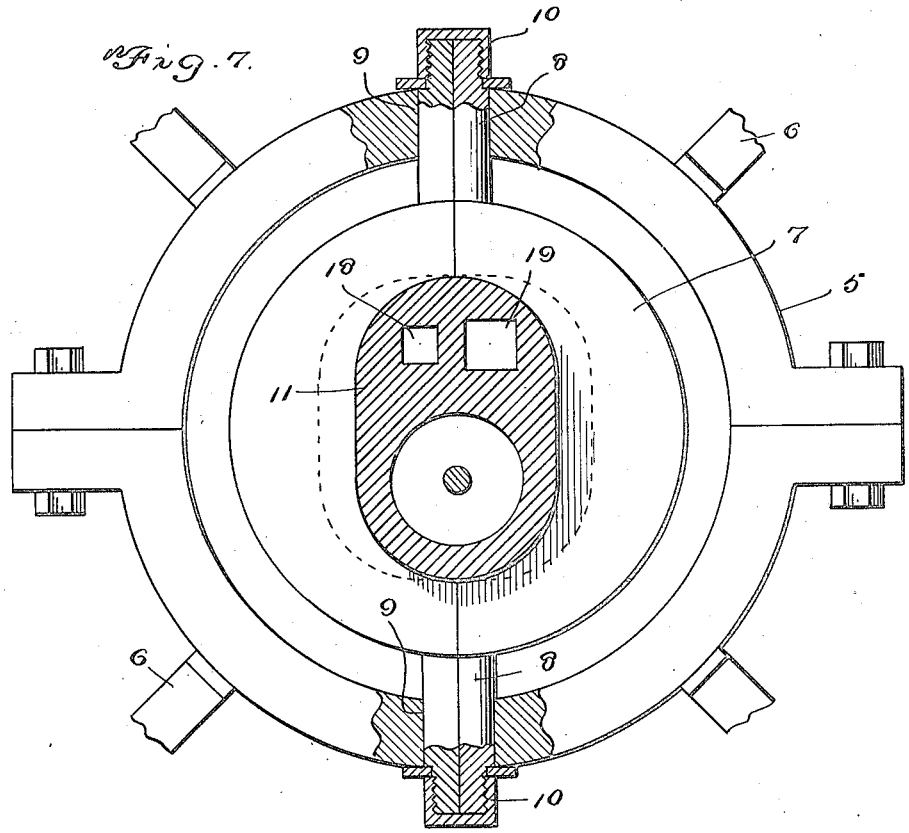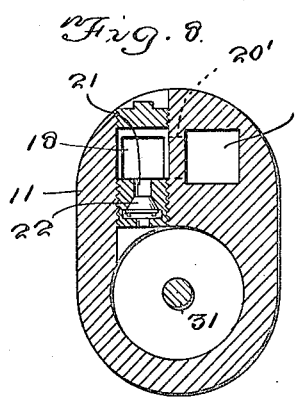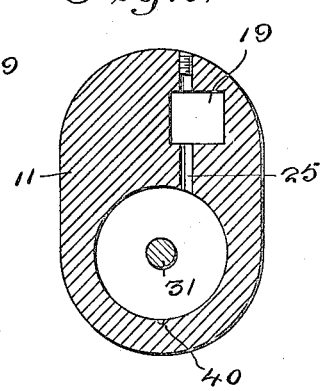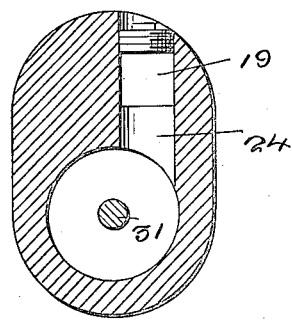

Patented Mar. 20, 1923.

1,449,261

UNITED STATES PATENT OFFICE.

GLEN D. BEVIS, OF MARION, OHIO.

AIR COUPLING.

Application filed July 11, 1921. Serial No. 483,823.

*To all whom it may concern:*

Be it known that I, GLEN D. BEVIS, a citizen of the United States, residing at Marion, in the county of Marion and State of Ohio, have invented new and useful Improvements in Air Couplings, of which the following is a specification.

This invention relates to couplers for the airline of railway trains, the general object of the invention being to provide means whereby the sections of the line are automatically connected together by the coupling together of the cars of the train so that the service of the train-man is unnecessary.

Another object of the invention is to provide means for maintaining the reduced air pressure in the line, after the cars have been uncoupled and the brakes have been applied, so that it is only necessary to work the pump to restore the pressure to normal to remove the brakes after the sections of the train have been coupled again.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the adjacent end of a pair of bars supplied with my invention.

Figure 2 is a plan view of Figure 1, the car coupler being omitted.

Figure 5 is a section somewhat similar to Figure 3 but showing the parts in a different position.

Figure 6 is a section on line 6—6 of Figure 5.

Figure 7 is a section on line 7—7 of Figure 3.

Figure 8 is a section on line 8—8 of Figure 5.

Figure 9 is a section on line 9—9 of Figure 5.

Figure 10 is a section on line 10—10 of Figure 5.

Figure 11 is a section on line 11—11 of Figure 5.

Figure 12 is a sectional detail view of the coupling head.

Figure 3:
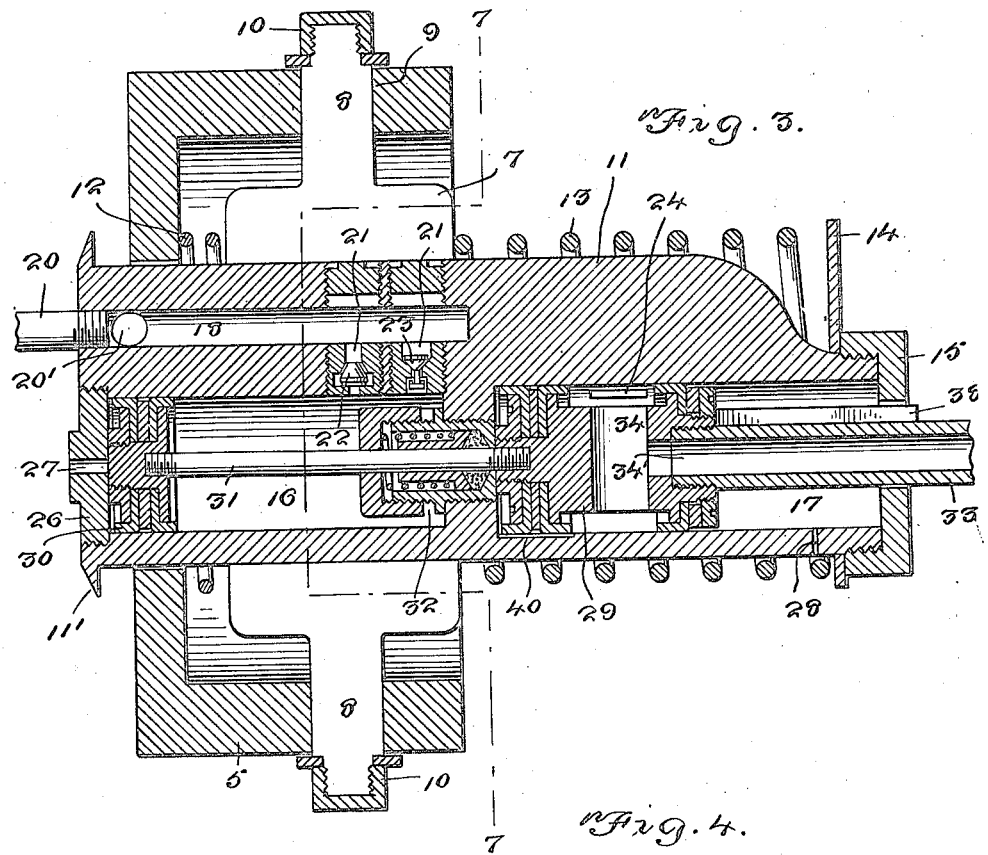
Figure 3 is an enlarged sectional view showing the interior construction of one of the coupling means.

In these views A indicates one car of the train and B the adjacent car which are coupled together in the ordinary manner by the couplings C. A' indicates the section of the train pipe carried by car A and B' the section carried by car B, these sections being provided with the flexible coupling parts $a$ and $b$ so that they can be coupled together by hand, in the usual manner. In carrying out the invention I provide a T-coupling 1 at each end of each section so that an upright pipe 2 can be connected with each end of each pipe section. The upper end of this pipe is connected with a casing 3 secured to each end of each car at a point a considerable distance above the platform thereof so that the air coupling means will be out of the way of a trainman manipulating the coupling head C and also preventing obstructions along the track from injuring the air coupling means. The casing 3 is placed on supporting plate 4 which is secured to the end of the car and a boxing 5 is supported on said plate by means of the arms 6. A small boxing 7 is rockingly supported in boxing 5 by means of its oppositely arranged trunnions 8 engaging diametrically arranged holes 9 in boxing 5 and these parts are held in position by the caps 10 engaging the screw threaded projecting ends of the trunnions and each boxing is formed of two halves, the two parts of the boxing 5 being bolted together while the two parts of the boxing 7 are held together by their trunnions engaging the holes in the boxing 5. It will thus be seen that the boxing 7 will have limited rotary movement about a vertical axis. A body 11 is slidably mounted in boxing 7 and this body passes through an opening in the rear of boxing 5 and its rear end is provided with a flange 11' for engaging the rear face of boxing 5 for limiting the forward movement of said body in the boxing. The coil spring 12 surrounds the rear part of the body and has one end pressing against the boxing 5 and its front end against the boxing 7 and a second spring 13 is placed on the front part of the body with one end engaging the front face of the boxing 7 and its front end engaging a flange or disc 14, which is held on the front end of the body by a screw threaded cap 15. These springs tend to hold the body in its forward position and resist a rocking movement of boxing 7 in boxing 5.

The body 11 is provided with a pair of aligned chambers 16 and 17, in its lower part and with a pair of channels 18 and 19 in its upper part. These channels are placed side by side and are in communication with each other by the port 20' and the channel 18 is connected by the flexible piping 20 with the casing 3 so that both channels are in communication with the train pipe. A pair of ports 21 connect channel 18 with chamber 16, these ports having suitable valve seats therein, one of which receives the upwardly closing valve 22 and the other the double headed valve 23. Valve 22 is normally held open under the action of gravity while valve 23 is held closed by gravity.

Channel 19 is connected with chamber 17 by a large port 24 and a small port 25, this small port being arranged at the inner end of the chamber 17. The rear end of chamber 16 is closed by a screw plug 26 which is provided with a port 27 and a port 28 connects the front part of chamber 17 with the atmosphere.

Figure 4:
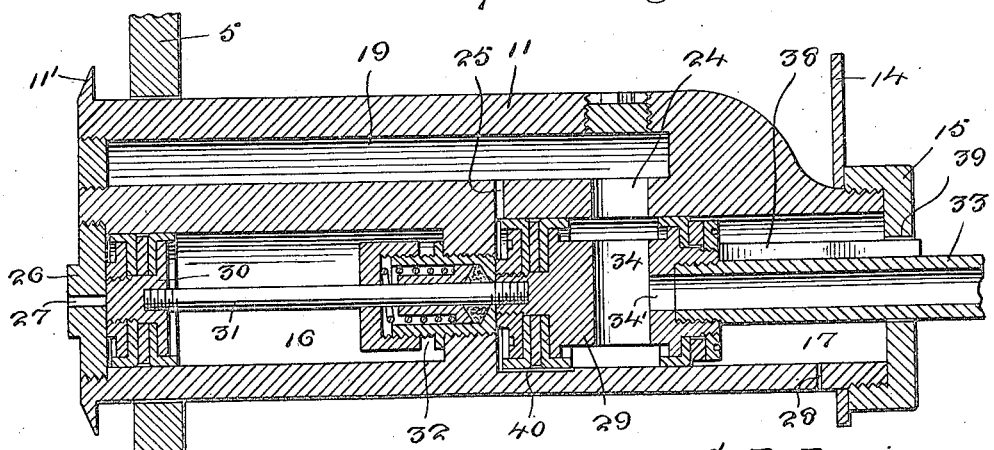
Figure 4 is a similar view with the section taken on another plane.

A spool-like piston 29 is arranged in chamber 17 and a piston 30 is arranged in chamber 16, these two pistons being connected together by the rod 31 which passes through suitable packing means 32 arranged in the partition between the two chambers. A tube 33 is connected with the front end of piston 29 and the bore of said tube is connected by the passages 34 and 34' in the piston with the annular space around the central part of the piston. This tube passes through the cap 15 and has its outer end connected with the coupling head 35 which carries the arms 36 and the gasket 37. The parts on this coupling head are so arranged that when two cars come together the arms 36 on one head engaging the arms on the other head will act to guide the two gaskets 37 together so as to make a tight joint between the two heads and this action will cause the tubes 33 and their attached parts to make a slight turning movement, thus insuring a tight fit between the two gaskets. This turning movement of the tubes 33 is limited by a key 38 on each tube engaging an arc-shaped slot 39 in the cap 15. This coming together of the coupling heads will also force back the two bodies 11, as shown in Figures 1 and 2 so that the springs 13 are held in partly compressed condition, thus pressing the gaskets against each other. The coupling action will also cause the pistons 29 and 30 to move to the rear of their chambers, as shown in Figures 3 and 4, Figure 5 showing the position of the parts when in uncoupled position. In this rearward movement of the pistons the air in the rear of chamber 16 will escape through the port 27 and the air in rear of chamber 17 will act to cushion the parts and thus prevent injury thereto. Chamber 17 is of larger diameter than chamber 16 and of course the piston 29 is of larger diameter than piston 30. A small groove 40 in the bottom of chamber 17 will connect the rear end of said chamber with the annular space formed by the piston when the piston is in its rearward position so that any water or the like collecting in the rear of the chamber will pass into said space so that it will be discharged through the port 28 when the parts assume the position shown in Figure 5, when the cars are uncoupled.

It will be seen that when the cars are coupled the train pipe sections will be in communication with each other through the channels 18 and 19, port 24, the annular space around the cylinder 29, passages 34 and 34' and the bores of the tubes 33 but when the cars are uncoupled and the pistons assume the positions shown in Figure 5 this communication will be broken as port 24 will be to the rear of piston 29. The pressure in the line tends to hold the pistons in their forward positions due to its action on the rear end of piston 29 through the port 25.

When two cars come together and the parts are forced to the position shown in Figures 3 and 4 the air in the pipeline will pass through port 21 which is controlled by valve 22, into chamber 16, this valve being normally in open position so that the pressure in this chamber 16 will be the same as that in the pipeline. If the car is uncoupled the air in the pipeline would begin to flow through the uncoupled head and as soon as this started the pressure in the chamber 16 would force valve 22 to its seat and thus the air in chamber 16 would be trapped as the valve 23 would still be closed due to the pressure in the line acting against the enlarged head of the valve counter-acting the superior pressure in chamber 16 acting on the small head of the valve. This valve is so formed that it will remain closed until the pressure against its large head is twenty pounds lower than the pressure upon the small head, but when this difference in pressure occurs the valve will open and the trapped air in chamber 16 will escape into the line, thus permitting the cylinders to move forwardly and prevent further escape of air. Thus the pressure in the pipeline of the uncoupled car will remain twenty pounds below normal so that the brakes of this car will be held in engagement with the wheels. When the car is again coupled to the next car the pistons will be moved rearwardly under the coupling action and the valves will assume their first positions so that the pressure in chamber 16 will be the same as that in the pipeline. It is then only necessary to pump twenty pounds of air into the line to remove the brakes.

When the air is trapped in chamber 16 it will hold the pistons in their rearward positions and prevent the reduced pressure in the line, acting on the rear face of valve 29 through port 25, from forcing the pistons forwardly but as soon as this air in chamber 16 is released by valve 23 the pressure in the line acting on piston 29 will force the same forwardly. The air rushing from chamber 16 also permits the piston 30 to move forwardly.

It will be seen that the arrangement of parts with the springs will permit relative movement between the cars and at the same time keep an air tight trainline. The coupling is entirely automatic and does not need any attention on the part of the trainman. When making up a train in the yards or picking up cars on the road the last car will always retain the air just the same as with a closed angle cock, thus it is not necessary for the train-man to inspect each cock to see that it is closed as is necessary with the equipment now in use. The coupler is operated entirely by air with the exception of the two springs which are used to recoil the body when there is no air in the train-line and the car is uncoupled. The parts are so constructed that if a portion thereof should become broken or out of order the airline would be put in "emergency," the same as with an uncoupled air hose, if coupler was uncoupled. If it was not uncoupled the device would maintain a tight trainline. The invention can be easily and quickly applied to the present equipment as it is simply necessary to attach the trainline with the T-union just back of the angle cock, as shown in Figure 1. The invention will not interfere with the working of the present equipment and a car equipped with my invention can be used on a train not so equipped as the car can be coupled in the ordinary manner with the airline of the train. If the draw bar is pulled it will not injure or destroy the improved coupling.

By the use of my invention the operation of the air pump is reduced to a minimum as the air is maintained in the line by the steel construction doing away with the leaks so frequent in hose and their couplers and a higher efficiency in the braking power of the train is secured by the elimination of these leaks.

By having the coupling parts situated well above the platforms of the cars there is no danger of obstructions along the track or snow or ballast injuring the parts thereof.

If at any time during the application of the brakes, regardless as to whether a heavy or a light reduction of pressure is made and a train should part before the brakes are released the improved coupler would insure the rest of the reduction to cause an emergency application of the brakes. If a train should part after the brakes were released they would be applied again by the device.

If a train should break in two on a grade the device on the rear car of the section connected with the engine will close as soon as the pressure has been reduced twenty pounds. The engineer would then place his valve handle in full released position to release the brakes so that he can get away from the broken section. The brakes of the cars of the broken section will remain on as the device on the front car of this section will close as soon as the pressure is reduced twenty pounds.

The construction of the valve 23 will cause this valve to release the trapped air in chamber 16 after 20 pounds reduction in the pipe line regardless of the pressure carried in the said line.

While the boxing 7 is shown and described as formed of two parts this may be formed of one piece, the body 11 being placed in the opening in the same from the rear after the cap 15 and ring 14 have been removed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A train pipe coupling comprising a coupling head having a passage therein, a supporting member for the head having a conduit therein leading to the passage, means for connecting said conduit with the air line and means in said member for closing the conduit when a reduction of pressure occurs therein sufficient to apply the brakes and the head is in uncoupled position.

2. A train pipe coupling comprising a body having passages therein, means for connecting said passages with the air line, a coupling head carried by the body and having a passage adapted to communicate with one of the body passages and means within the body for closing communication to the passage in the head when the head is in uncoupled position and the pressure in the air line has been reduced sufficiently to apply the brakes.

3. A train pipe coupling comprising a body having passages and chambers therein, pistons in said chambers, a coupling head connected with the pistons, means for connecting the passages with the air line, ports connecting the passages with the chambers in the body and valve means controlling the ports which connect one chamber with one of the passages, such means being arranged to maintain the pressure in said chamber equal to that in the pipeline as long as the parts are in coupled position but to trap the air in said chamber when the coupling is broken to permit leakage of the pressure in the pipeline through the broken coupling to reduce the pressure to apply the brakes after which the valve means will free the trapped air to permit the parts to move to uncoupled position with the passage leading to the other chamber closed.

4. A train pipe coupling comprising a body having a pair of chambers therein and a pair of communicating passages, means for connecting one passage with the airline, a pair of ports connecting one passage with one chamber, a pair of ports connecting the other passage with the other chamber, a piston in each chamber, means for connecting the pistons together, the front piston having passages therein which communicate with one of the ports leading to the front chamber in one position of the piston, the other port leading to the rear of said front chamber to cause the air to act upon the rear end of the piston, a tube connected with the front piston and in communication with the passages therein, a coupling head carried by the outer end of the tube, an upwardly closing valve controlling one of the ports leading to the other chamber, a double headed valve controlling the second port leading to this chamber, said double headed valve being held to its seat by gravity and having its upper head of greater diameter than its lower head, the first valve acting to trap the air in the chamber when the pressure in the air line is lower than that in the chamber and the second valve acting to free this air when the reduction of pressure in the airline is sufficient to apply the brakes.

In testimony whereof I affix my signature.

GLEN D. BEVIS.